United States Patent
Yamazaki (10) Patent No.: US 7,444,220 B2
(45) Date of Patent: Oct. 28, 2008

(54) POWER OUTPUT APPARATUS FOR HYBRID VEHICLE

(75) Inventor: Makoto Yamazaki, Gotenba (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 72 days.

(21) Appl. No.: 11/578,538

(22) PCT Filed: May 6, 2005

(86) PCT No.: PCT/JP2005/008738

§ 371 (c)(1),
(2), (4) Date: Oct. 16, 2006

(87) PCT Pub. No.: WO2005/108760

PCT Pub. Date: Nov. 17, 2005

(65) Prior Publication Data

US 2007/0213167 A1      Sep. 13, 2007

(30) Foreign Application Priority Data

May 11, 2004    (JP) .............................. 2004-141300

(51) Int. Cl.
G06F 19/00    (2006.01)
F02M 25/07    (2006.01)
F02D 41/00    (2006.01)

(52) U.S. Cl. ...................... 701/51; 701/108; 123/568.21

(58) Field of Classification Search ................. 701/101, 701/103, 104, 108, 22, 54; 180/65.1–65.3, 180/165; 123/568.11, 568.21
See application file for complete search history.

(56) References Cited

U.S. PATENT DOCUMENTS

| | | | |
|---|---|---|---|
| 6,263,267 | B1 | 7/2001 | Anthony et al. |
| 6,425,365 | B1 | 7/2002 | Peters et al. |
| 6,656,082 | B1 * | 12/2003 | Yamada et al. ................. 477/5 |
| 6,886,648 | B1 * | 5/2005 | Hata et al. ................. 180/65.2 |
| 7,062,916 | B2 * | 6/2006 | Kamijo et al. ................. 60/706 |
| 2005/0266957 | A1 * | 12/2005 | Kamijo et al. ................. 477/3 |

FOREIGN PATENT DOCUMENTS

| | | |
|---|---|---|
| EP | 0 943 790 A2 | 9/1999 |
| JP | 10-299580 | 11/1998 |
| JP | 11-182280 | 7/1999 |
| JP | 2000-282910 A | 10/2000 |
| JP | 2001-037008 A | 2/2001 |

* cited by examiner

Primary Examiner—Willis R. Wolfe, Jr.
Assistant Examiner—Johnny H. Hoang
(74) Attorney, Agent, or Firm—Kenyon & Kenyon LLP (57) ABSTRACT

Under a switchover operation of an EGR valve from OFF to ON or from ON to OFF, the control procedure of the invention keeps an engine power demand Pe*, which is to be output from an engine and is set corresponding to a torque demand Tr* to be output to a drive shaft, unchanged to a previous level (Previous Pe*) set immediately before the switchover operation of the EGR valve (step S120). A torque command Tm2* of a motor MG2 is set to ensure output of the torque demand Tr* to the drive shaft (step S126). The engine and motors MG1 and MG2 are then driven and controlled with preset target values and torque commands. Such control desirably prevents a variation in load of the engine simultaneous with the switchover operation of the EGR valve and accordingly ensures favorable emission control performance, while attaining output of the torque demand Tr* to the drive shaft.

8 Claims, 10 Drawing Sheets

POWER OUTPUT APPARATUS FOR HYBRID VEHICLE

This is a 371 national phase application of PCT/JP2005/008738 filed 6 May 2005, claiming priority to Japanese Patent Application No. 2004-141300 filed 11 May 2004, the contents of which are incorporated herein by reference.

TECHNICAL FIELD

The present invention relates to a power output apparatus, a motor vehicle equipped with the power output apparatus, and a control method of the power output apparatus. More specifically the invention pertains to a power output apparatus that outputs power to a drive shaft, a motor vehicle that is equipped with such a power output apparatus and has an axle linked to the drive shaft, and a method of controlling such a power output apparatus.

BACKGROUND ART

A proposed power output apparatus is mounted on a hybrid vehicle equipped with a motor generator and an engine, which is drivable with a variation in supply rate of exhaust gas to an intake pipe (EGR rate or exhaust gas recirculation rate) (see, for example, Japanese Patent Laid-Open Gazette No. 2000-282910). This prior art power output apparatus drives the engine with a target EGR rate, which is set according to the measurements of an engine rotation speed, a fuel injection flow, and a cooling water temperature of the engine. Such control is expected to ensure a certain level of emission control performance and minimize the emission of toxic components (NOx).

DISCLOSURE OF THE INVENTION

This prior art power output apparatus can not, however, assure a sufficient level of emission control performance under some conditions. For example, a variation in load of the engine under a change of the supply rate of the exhaust gas undesirably deviates the air-fuel ratio of the air fuel mixture supplied to the engine from the stoichiometric air-fuel ratio that minimizes the emission of the toxic components (NOx), and accordingly worsens the emission control performance.

The power output apparatus, the motor vehicle equipped with the power output apparatus, and the control method of the power output apparatus of the invention thus aim to eliminate the drawback of the prior art technique and to assure a sufficient level of emission control performance of an internal combustion engine, which is drivable with a supply of exhaust gas to its intake system, even under a changeover operation of the supply of the exhaust gas. The power output apparatus, the motor vehicle equipped with the power output apparatus, and the control method of the power output apparatus of the invention also aim to assure output of a required driving force to a drive shaft, while attaining a certain level of emission control performance of an internal combustion engine, which is drivable with a supply of exhaust gas to its intake system, even under a changeover operation of the supply of the exhaust gas.

In order to attain at least part of the above and the other related objects, a power output apparatus, a motor vehicle equipped with the power output apparatus, and a control method of the power output apparatus of the invention have the configurations discussed below.

The present invention is directed to a power output apparatus that outputs power from an internal combustion engine and power from a motor to a drive shaft, where the internal combustion engine is drivable with a changeable supply of an exhaust gas to an intake system of the internal combustion engine, and the power output apparatus includes: a changeover state control module that, under a changeover operation of the supply of the exhaust gas, controls the internal combustion engine to prevent a variation in load of the internal combustion engine until completion of the changeover operation, while controlling the motor to ensure output of a required driving force to the drive shaft.

Under a changeover operation of the supply of the exhaust gas, the power output apparatus of the invention controls the internal combustion engine to prevent a variation in load of the internal combustion engine until completion of the changeover operation, while controlling the motor to ensure output of a required driving force to the drive shaft. Such control desirably prevents a variation in load of the internal combustion engine simultaneous with the changeover operation of the supply of the exhaust gas, while regulating the output power level of the motor to ensure the output of the required driving force to the drive shaft. This arrangement thus attains the favorable emission control performance, simultaneously with an effective response to the required driving force.

In one preferable embodiment of the invention, the power output apparatus include: an accumulator unit that is charged with electric power received from the motor and discharges electric power to give a supply to the motor; and an engine target power setting module that sets a target power to be output from the internal combustion engine corresponding to the required driving force, and the changeover state control module executes a specific control procedure that keeps unchanged a last target power, which has been set by the engine target power setting module immediately before the changeover operation of the supply of the exhaust gas, and controls the internal combustion engine to be driven with the unchanged last target power, while regulating an output power level of the motor, accompanied with the charge and the discharge of electric power to and from the accumulator unit, to compensate for a difference between the last target power and a power equivalent to the required driving force. In this embodiment, when the specific control procedure, which controls the internal combustion engine to be driven with the unchanged last target power and regulates the output power level of the motor to ensure the output of the required driving force to the drive shaft, causes the output power level of the motor to exceed an allowable power output range, the changeover state control module may control the internal combustion engine to be driven with a current target power set corresponding to the required driving force by the engine target power setting module and control the motor to ensure the output of the required driving force to the drive shaft, even under the changeover operation of the supply state of the exhaust gas. Further, when a difference between the last target power and a current target power set corresponding to the required driving force by the engine target power setting module is not less than a preset reference value, the changeover state control module may control the internal combustion engine to be driven with the current target power and control the motor to ensure the output of the required driving force to the drive shaft, even under the changeover operation of the supply state of the exhaust gas. This arrangement assures output of the required driving force to the drive shaft, while attaining a certain level of the emission control performance.

In the power output apparatus of the invention, the changeover operation of the supply of the exhaust gas may change from a non-supply state to a supply state of the exhaust gas or from the supply state to the non-supply state of the exhaust gas.

The power output apparatus of the invention may further include: a three shaft-type power input output module that is linked to three shafts, that is, an output shaft of the internal combustion engine, the drive shaft, and a third rotating shaft, and automatically determines power input from and output to a residual one shaft based on powers input from and output to any two shafts among the three shafts; and a generator that is connected to the third rotating shaft. Moreover, the power output apparatus of the invention may include a pair-rotor motor that has a first rotor linked to an output shaft of the internal combustion engine and a second rotor linked to the drive shaft and rotates the first rotor and the second rotor relative to each other through an electromagnetic function.

The present invention is also directed to a motor vehicle equipped with a power output apparatus having any of the above arrangements, that is, a power output apparatus that basically outputs power from an internal combustion engine and power from a motor to a drive shaft, where the internal combustion engine is drivable with a changeable supply of an exhaust gas to an intake system of the internal combustion engine. The drive shaft is linked to an axle of the motor vehicle to drive the motor vehicle. The power output apparatus includes a changeover state control module that, under a changeover operation of the supply of the exhaust gas, controls the internal combustion engine to prevent a variation in load of the internal combustion engine until completion of the changeover operation, while controlling the motor to ensure output of a required driving force to the drive shaft.

The motor vehicle of the invention is equipped with the power output apparatus having any of the above arrangements and accordingly exerts the similar effects to those of the power output apparatus of the invention described above. The motor vehicle of the invention thus attains the favorable emission control performance, simultaneously with an effective response to the required driving force.

Further, the present invention is directed to a control method of a power output apparatus that outputs power from an internal combustion engine and power from a motor to a drive shaft, where the internal combustion engine is drivable with a changeable supply of an exhaust gas to an intake system of the internal combustion engine, and the power output method including the step of: under a changeover operation of the supply of the exhaust gas, controlling the internal combustion engine to prevent a variation in load of the internal combustion engine until completion of the changeover operation, while controlling the motor to ensure output of a required driving force to the drive shaft.

Under a changeover operation of the supply of the exhaust gas, the control method of the power output apparatus of the invention controls the internal combustion engine to prevent a variation in load of the internal combustion engine until completion of the changeover operation, while controlling the motor to ensure output of a required driving force to the drive shaft. Such control desirably prevents a variation in load of the internal combustion engine simultaneous with the changeover operation of the supply of the exhaust gas, while regulating the output power level of the motor to ensure the output of the required driving force to the drive shaft. This arrangement thus attains the favorable emission control performance, simultaneously with an effective response to the required driving force.

BRIEF DESCRIPTION OF THE DRAWINGS

FIG. 7 shows time variations in accelerator opening Acc, vehicle speed V, power demand Pr*, opening of an EGR valve, engine power demand Pe*, and torque command Tm2* of a motor MG2 under a switchover operation of the EGR valve from OFF to ON;

BEST MODE OF CARRYING OUT THE INVENTION

One mode of carrying out the invention is discussed below as a preferred embodiment.

Figure 1:
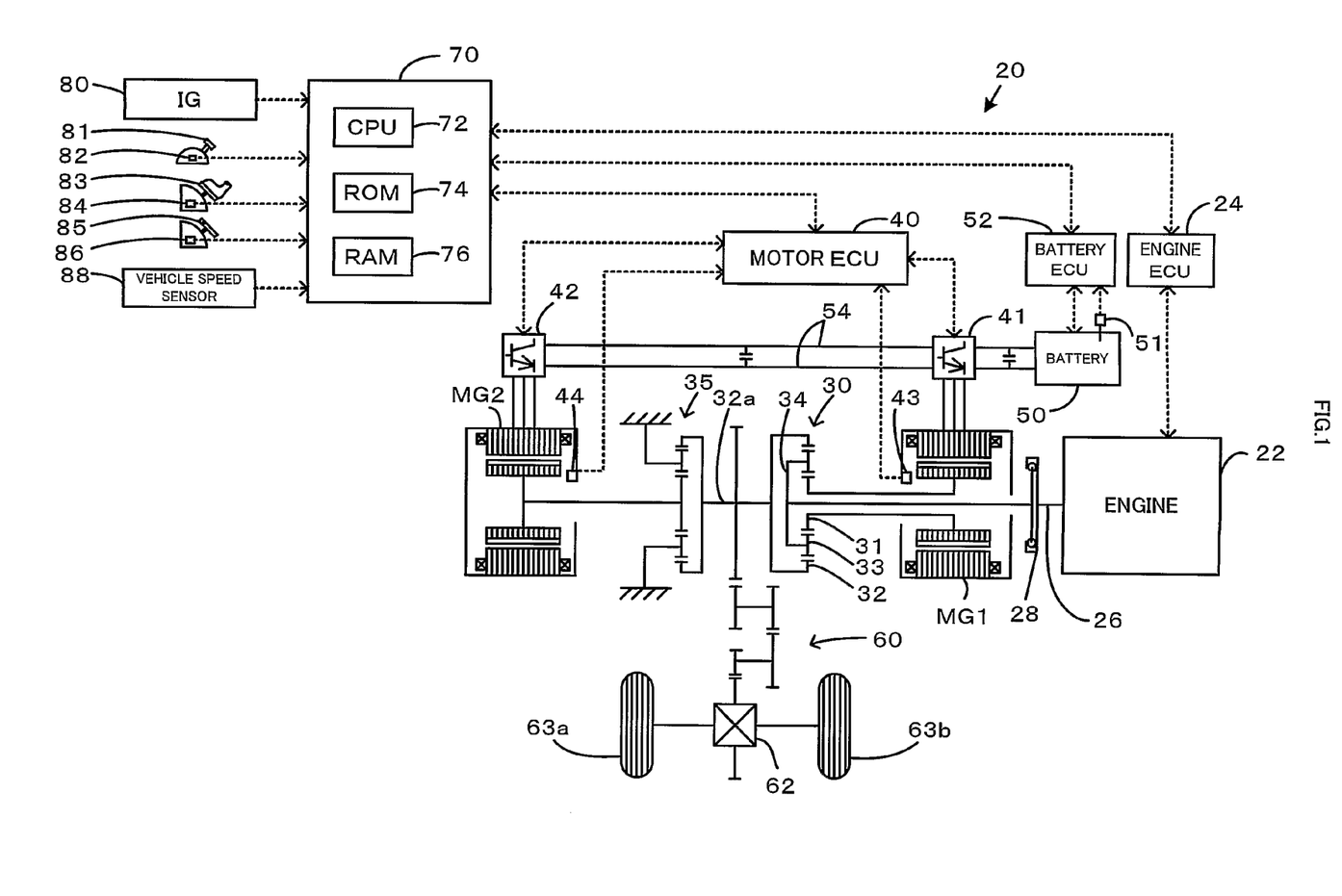
FIG. 1 schematically illustrates the configuration of a hybrid vehicle equipped with a power output apparatus in one embodiment of the invention.
Figure 2:
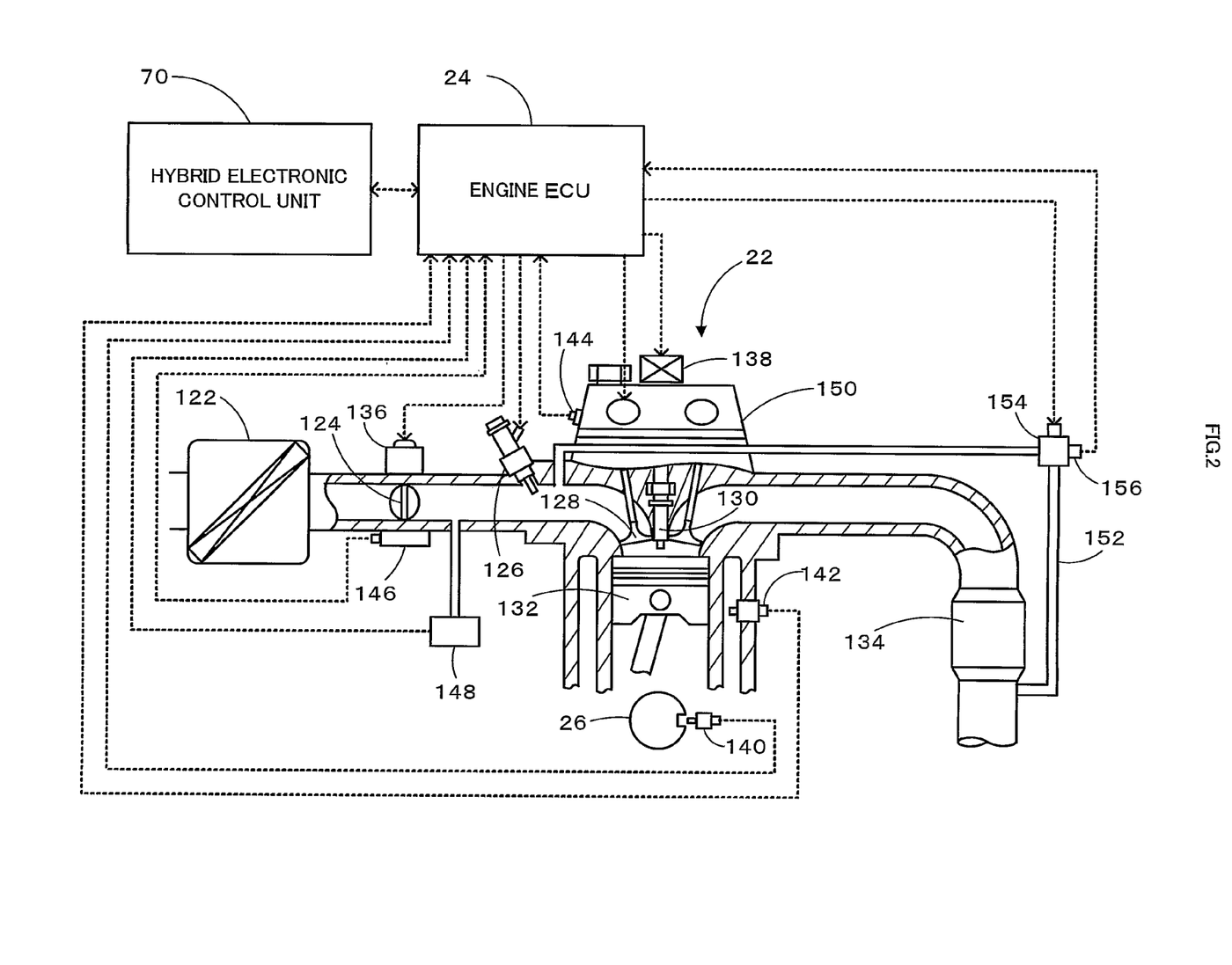
FIG. 2 schematically illustrates the structure of an engine mounted on the hybrid vehicle of FIG. 1.

FIG. 1 schematically illustrates the configuration of a hybrid vehicle 20 equipped with a power output apparatus in one embodiment of the invention. FIG. 2 schematically illustrates the structure of an engine 22 mounted on the hybrid vehicle 20. As illustrated, the hybrid vehicle 20 of the embodiment includes the engine 22, a three shaft-type power distribution integration mechanism 30 that is linked to a crankshaft 26 or an output shaft of the engine 22 via a damper 28, a motor MG1 that is linked to the power distribution integration mechanism 30 and is capable of generating electric power, a reduction gear 35 that is attached to a ring gear shaft 32a or a drive shaft linked to the power distribution integration mechanism 30, a motor MG2 that is connected with the reduction gear 35, and a hybrid electronic control unit 70 that controls the respective constituents of the power output apparatus.

The engine 22 is an internal combustion engine that consumes a hydrocarbon fuel, such as gasoline or light oil, to output power. As shown in FIG. 2, the engine 22 receives a supply of the air cleaned by an air cleaner 122 and ingested via a throttle valve 124, while receiving a supply of gasoline injected by a fuel injection valve 126. The supplies of the air and gasoline are mixed to an air-fuel mixture, which is introduced into a combustion chamber via an intake valve 128 and is ignited for explosive combustion with an electric spark of an ignition plug 130. Reciprocating motions of a piston 132 by means of energy of the explosive combustion are converted into rotations of the crankshaft 26. The exhaust gas from the engine 22 goes through a catalytic converter (three-way catalyst) 134 for removal of toxic components contained in the exhaust gas, that is, carbon monoxide (CO), hydrocarbons (HC), and nitrogen oxides (NOx), and is discharged to the outside air. An EGR (exhaust gas recirculation) pipe 152 located downstream of the catalytic converter 134 makes the flow of the exhaust gas to the intake system of the engine 22. The uncombusted exhaust gas is flowed to the intake system of the engine 22 via an EGR valve 154 provided in the EGR pipe 152 and is mixed with the flow of the air-fuel mixture to be introduced into the combustion chamber.

The engine 22 is under control of an engine electronic control unit (hereafter referred to as engine ECU) 24. The engine ECU 24 inputs signals representing the present conditions of the engine 22 from various sensors via its input port (not shown). For example, the engine ECU 24 receives, via its input port, a crank position or a rotational position of the crankshaft 26 and a rotation speed of the crankshaft 26 from a crank position sensor 140, a cooling water temperature of the engine 22 from a water temperature sensor 142, a cam position or a rotational position of a cam shaft, which opens and closes the intake valve 128 and an exhaust valve for gas intake and exhaust into and from the combustion chamber, from a cam position sensor 144, a throttle position or a position of the throttle valve 124 from a throttle valve position sensor 146, an air intake flow as a load of the engine 22 from a vacuum sensor 148, and an EGR valve opening or an opening of the EGR valve 154 from an opening sensor 156. The engine ECU 24 outputs diversity of drive signals and control signals to drive and control the engine 22 via its output port (not shown). For example, the engine ECU 24 outputs, via its output port, drive signals to the fuel injection valve 126, to a throttle motor 136 for regulating the position of the throttle valve 124, and to the EGR valve 154 for regulating the flow of the exhaust gas introduced to the intake system, and control signals to an ignition coil 138 integrated with an igniter and to a variable valve timing mechanism 150 for varying the open and close timings of the intake valve 128. The engine ECU 24 establishes communication with the hybrid electronic control unit 70 and receives control signals from the hybrid electronic control unit 70 to drive and control the engine 22, while outputting data regarding the driving conditions of the engine 22 to the hybrid electronic control unit 70 according to the requirements.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 63a and 63b via the gear mechanism 60, and the differential gear 62 from ring gear shaft 32a.

Both the motors MG1 and MG2 are known synchronous motor generators that are driven as a generator and as a motor. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. The battery 50 is charged with a surplus of the electric power generated by the motor MG1 or MG2 and is discharged to supplement an insufficiency of the electric power. When the power balance is attained between the motors MG1 and MG2, the battery 50 is neither charged nor discharged. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature measured by a temperature sensor (not shown) attached to the battery 50. The battery ECU 52 outputs data relating to the state of the battery 50 to the hybrid electronic control unit 70 via communication according to the requirements. The battery ECU 52 calculates a state of charge (SOC) of the battery 50, based on the accumulated charge-discharge current measured by the current sensor, for control of the battery 50.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously.

The hybrid vehicle 20 of the embodiment thus constructed calculates a torque demand to be output to the ring gear shaft 32a functioning as the drive shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gearshaft 32a. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a.

Figure 3:
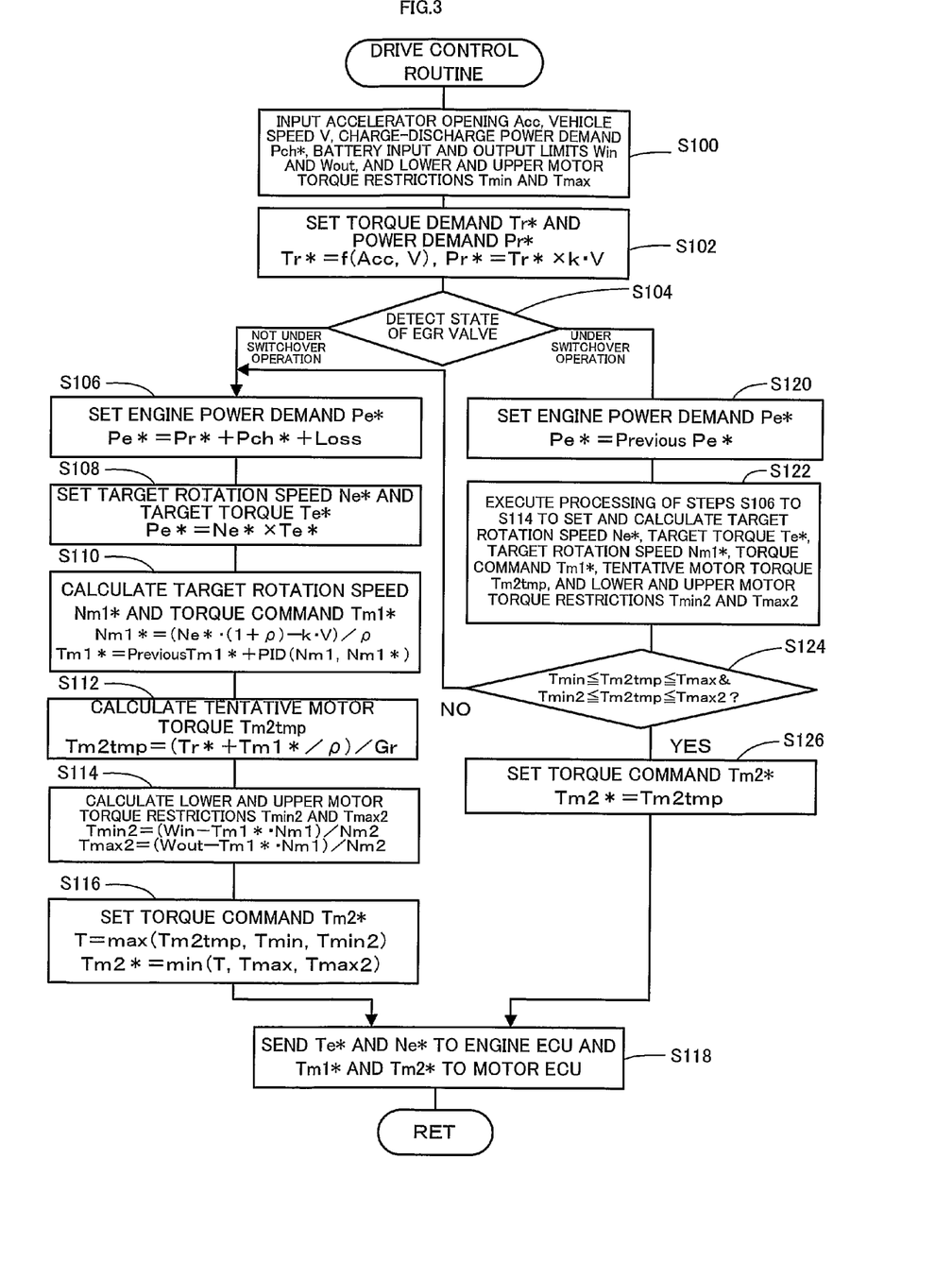
FIG. 3 is a flowchart showing a drive control routine executed by a hybrid electronic control unit in the hybrid vehicle of the embodiment.

The description now regards the operations of the hybrid vehicle 20 of the embodiment constructed as discussed above, especially the operations of the engine 22 and the motors MG1 and MG2 in response to a switchover operation of the EGR valve 154 from OFF to ON or from ON to OFF. FIG. 3 is a flowchart showing a drive control routine executed by the hybrid electronic control unit 70 in the hybrid vehicle 20 of the embodiment. This routine is carried out repeatedly at preset time intervals (for example, at every 8 msec).

In the drive control routine, the CPU 72 of the hybrid electronic control unit 70 first inputs various data required for control, that is, the accelerator opening Acc from the accelerator pedal position sensor 84, the vehicle speed V from the vehicle speed sensor 88, a charge-discharge power demand Pch* of the battery 50, input and output limits Win and Wout of the battery 50, and lower and upper torque restrictions Tmin and Tmax of the motor MG2 (step S100). The charge-discharge power demand Pch* of the battery 50 input here has been set based on a remaining charge or a current state of charge (SOC) computed by and sent from the battery ECU 52 via communication. The input and output limits Win and Wout of the battery 50 input here have been set based on the state of charge (SOC) and the battery temperature Tb of the battery 50 sent from the battery ECU 52 via communication. The lower and upper torque restrictions Tmin and Tmax of the motor MG2 input here have been set, for example, by multiplying a rated torque of the motor MG2 at a measured rotation speed Nm2 by correction coefficients specified corresponding to the measured motor temperature and the measured inverter temperature.

Figure 4:
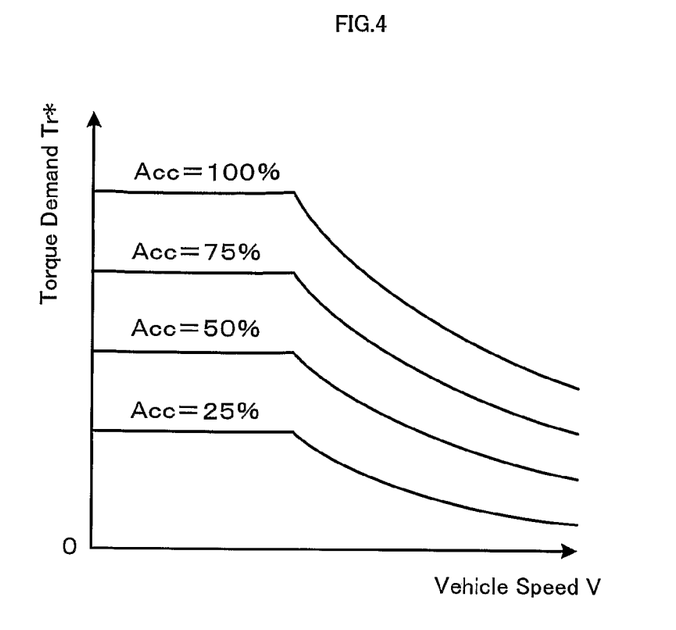
FIG. 4 shows one example of a torque demand setting map.

The CPU 72 subsequently sets a torque demand Tr* and a power demand Pr* to be output to the drive shaft or the ring gear shaft 32a, based on the input accelerator opening Acc and the input vehicle speed V (step S102). A concrete procedure of setting the torque demand Tr* in this embodiment stores in advance variations in torque demand Tr* against the accelerator opening Acc and the vehicle speed V as a torque demand setting map in the ROM 74 and reads the torque demand Tr* corresponding to the given accelerator opening Acc and the given vehicle speed V from the map. One example of the torque demand setting map is shown in FIG. 4. The power demand Pr* is calculated by multiplying the torque demand Tr* by the product of the vehicle speed V and a conversion coefficient k. The conversion coefficient k is used to convert the vehicle speed V into the rotation speed of the ring gear shaft 32a.

The CPU 72 then detects the current state of the EGR valve 154 (step S104). The current state of the EGR valve 154 is detected by determining whether the EGR valve 154 is currently under a switchover operation from ON to OFF or from OFF to ON by the engine ECU 24, based on a rotation speed Ne of the engine 22 from the crank position sensor 140 (rotation speed sensor) and an intake air flow Qa from the vacuum sensor 148. The determination of the status of the switchover operation depends upon, for example, whether the EGR valve opening or the opening of the EGR valve 154 from the opening sensor 156 has reached a target opening or whether a preset time period has elapsed since a start of the switchover operation of the EGR valve 154.

Figure 5:
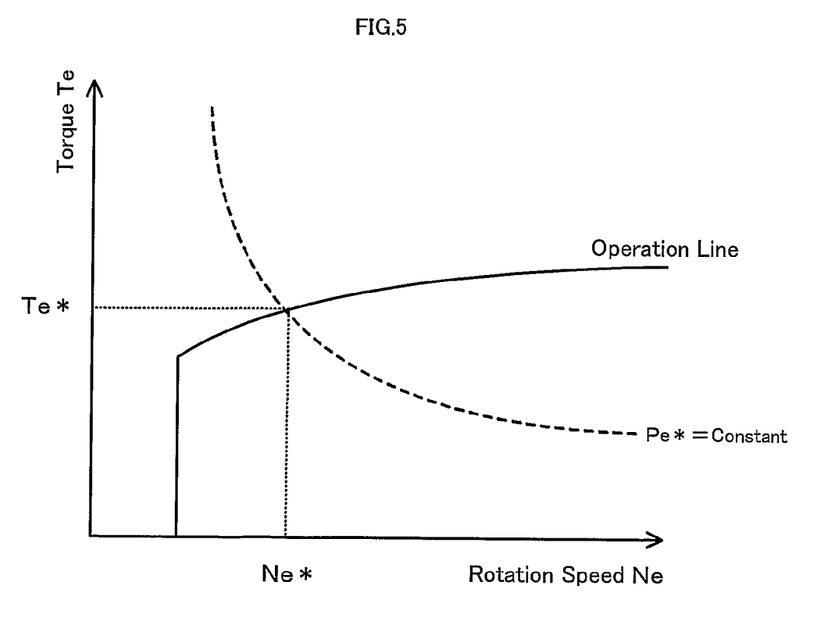
FIG. 5 shows setting of a target engine speed Ne* and a target torque Te* of the engine.

When it is determined at step S104 that the current state of the EGR valve 154 is not under a switchover operation, a standard control flow is selected to set an engine power demand Pe* to be output from the engine 22 as a sum of the power demand Pr* set at step S102, the charge-discharge power demand Pch* input at step S100, and a potential loss (step S106). An efficient drive point (defined by the rotation speed and the torque) to ensure efficient output of the engine power demand Pe* from the engine 22 is then set to a target rotation speed Ne* and a target torque Te* of the engine 22 (step S108). FIG. 5 shows setting of the target rotation speed Ne* and the target torque Te* of the engine 22. The target rotation speed Ne* and the target torque Te* are given at an intersection of an efficient operation line, which continuously connects efficient drive points of the engine 22, and a constant power demand line of the engine power demand Pe*.

The CPU 72 then calculates a target rotation speed Nm1* of the motor MG1 from the target rotation speed Ne* of the engine 22, a rotation speed Nr (=k·V) of the ring gear shaft 32a, and a gear ratio ρ of the power distribution integration mechanism 30 according to Equation (1) given below, while calculating a torque command Tm1* of the motor MG1 from the calculated target rotation speed Nm1* and a current rotation speed Nm1 of the motor MG1 according to Equation (2) given below (step S110):

$$Nm1^* = (Ne^* \cdot (1+\rho) - k \cdot V)/\rho \qquad (1)$$

$$Tm1^* = \text{Previous } Tm1^* + KP(Nm1^* - Nm1) + KI\int (Nm1^* - Nm1)dt \qquad (2)$$

Figure 6:
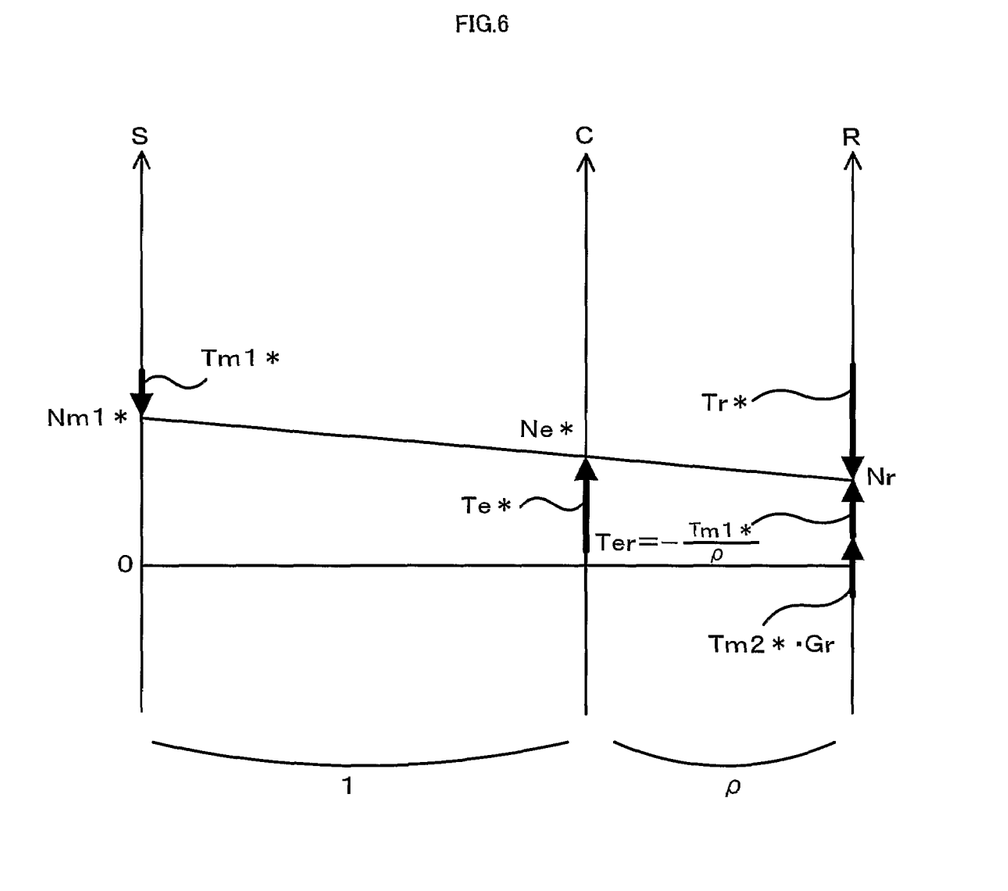
FIG. 6 is an alignment chart showing torque-rotation speed dynamics of the respective rotation elements included in a power distribution integration mechanism.

FIG. 6 is an alignment chart showing torque-rotation speed dynamics of the respective rotation elements included in the power distribution integration mechanism 30. The left axis 'S', the center axis 'C', and the right axis 'R' respectively represent the rotation speed of the sun gear 31, the rotation speed of the carrier 34, and the rotation speed Nr of the ring gear 32 (the ring gear shaft 32a). As explained above, the rotation speed of the sun gear 31 is equivalent to the rotation speed Nm1 of the motor MG1, while the rotation speed of the carrier 34 is equivalent to the rotation speed Ne of the engine 22. The target rotation speed Nm1* of the motor MG1 is thus computable from the rotation speed Nr (=k·V) of the ring gear shaft 32a, the target rotation speed Ne* of the engine 22, and the gear ratio ρ of the power distribution integration mechanism 30 according to Equation (1). The torque command Tm1* of the motor MG1 is then set to rotate the motor MG1 at the target rotation speed Nm1* and accordingly drive the engine 22 at the target rotation speed Ne*. Equation (2) is a relational expression of feedback control to drive and rotate the motor MG1 at the target rotation speed Nm1*. In Equation (2) given above, 'KP' in the second term and 'KI' in the third term on the right side respectively denote a gain of the proportional and a gain of the integral term.

After calculation of the target rotation speed Nm1* and the torque command Tm1* of the motor MG1, the CPU 72 calculates a tentative motor torque Tm2tmp, which is to be output from the motor MG2 to attain torque output corresponding to the torque demand Tr* to the ring gear shaft 32a, from the torque demand Tr*, the torque command Tm1* of the motor MG1, the gear ratio ρ of the power distribution integration mechanism 30, and the gear ratio Gr of the reduction gear 35 according to Equation (3) given below (step S112):

$$Tm2tmp=(Tr^*+Tm1^*/\rho)/Gr \qquad (3)$$

Equation (3) is introduced from the torque balance in the alignment chart of FIG. 6. The CPU 72 then calculates a lower torque restriction Tmin2 and an upper torque restriction Tmax2 as minimum and maximum torques output from the motor MG2 from the input and output limits Win and Wout of the battery 50, the torque command Tm1* and the current rotation speed Nm1 of the motor MG1, and the current rotation speed Nm2 of the motor MG2 according to Equations (4) and (5) given below (step S114):

$$Tmin2=(Win-Tm1^*\cdot Nm1)/Nm2 \qquad (4)$$

$$Tmax2=(Wout-Tm1^*\cdot Nm1)/Nm2 \qquad (5)$$

The maximum among the tentative motor torque Tm2tmp calculated at step S112, the lower torque restriction Tmin input at step S100, and the lower torque restriction Tmin2 calculated at step S114 is set to a value T, whereas the minimum among the value T, the upper torque restriction Tmax input at step S100, and the upper torque restriction Tmax2 calculated at step S114 is set to a torque command Tm2* of the motor MG2 (step S116). Such setting limits the torque command Tm2* of the motor MG2 in a range between the input lower torque restriction Tmin and the input upper torque restriction Tmax and in a range between the calculated lower torque restriction Tmin2 and the calculated upper torque restriction Tmax2. The torque command Tm2* is thus set in an allowable range determined by the input and the output limits Win and Wout of the battery 50 and the temperature limit of the motor MG2 and the inverter 42.

The CPU 72 sends the target rotation speed Ne* and the target torque Te* of the engine 22 to the engine ECU 24, while sending the torque commands Tm1* and Tm2* of the motors MG1 and MG2 to the motor ECU 40 (step S118), before exiting from the drive control routine. The engine ECU 24 receives the target rotation speed Ne* and the target torque Te* and executes fuel injection control and ignition control of the engine 22 to drive the engine 22 at a desired drive point defined by the target rotation speed Ne* and the target torque Te*. The motor ECU 40 receives the torque commands Tm1* and Tm2* of the motors MG1 and MG2 and executes switching control of the switching elements included in the respective inverters 41 and 42 to drive the motor MG1 with the torque command Tm1* and the motor MG2 with the torque command Tm2*.

When it is determined at step S104 that the current state of the EGR valve 154 is under a switchover operation, on the other hand, the control flow keeps the engine power demand Pe* to be output from the engine 22 unchanged to a previous level (Previous Pe*) set in a previous cycle of this routine (step S120), and sequentially executes the processing of steps S106 to S114 discussed above with this engine power demand Pe* to set and calculate the target rotation speed Ne* and the target torque Te* of the engine 22, the target rotation speed Nm1* and the torque command Tm1* of the motor MG1, the tentative motor torque Tm2tmp of the motor MG2, and the lower and the upper torque restrictions Tmin2 and Tmax2 (step S122). The control flow determines whether the tentative motor torque Tm2tmp is in the range between the lower torque restriction Tmin and the upper torque restriction Tmax input at step 9100 and in the range between the lower torque restriction Tmin2 and the upper torque restriction Tmax2 calculated at step S122 (step S124). In response to an affirmative answer, the tentative motor torque Tm2tmp is set to the torque command Tm2* of the motor MG2 (step S126). The CPU 72 then sends the target rotation speed Ne* and the target torque Te* of the engine 22 to the engine ECU 24, while sending the torque commands Tm1* and Tm2* of the motors MG1 and MG2 to the motor ECU 40 (step S118), before exiting from the drive control routine. Under a switchover operation of the EGR valve 154, the control flow keeps the engine power demand Pe* unchanged to the previous level (Previous Pe*) set in the previous cycle of this routine. This keeps the torque and the rotation speed of the engine 22 unchanged. Such control desirably prevents a variation in load of the engine 22 simultaneous with the change of the supply flow (ON-OFF) of the EGR valve 154, which leads to deviation of the air-fuel ratio from the stoichiometric air-fuel ratio that minimizes the emission of the toxic components (NOx), and accordingly assures the favorable emission control performance.

When it is determined at step S124 that the tentative motor torque Tm2tmp is out of the range between the input lower and upper torque restrictions Tmin and Tmax or out of the range between the calculated lower and upper torque restrictions Tmin2 and Tmax2, the control flow goes back to the processing of step S106 to reset the engine power demand Pe* as the sum of the power demand Pr*, the charge-discharge power demand Pch*, and the potential loss. The control flow then successively calculates and sets the target rotation speed Ne* and the target torque Te* of the engine 22 and the torque commands Tm1* and Tm2* of the motors MG1 and MG2 to control the engine 22 and the motors MG1 and MG2 (steps S108 to S116). In this situation, output of the torque demand Tr* to the ring gear shaft 32a is not attainable by keeping the engine power demand Pe* unchanged to the previous level. Preference is thus given to the output of the torque demand Tr* over the emission control performance, in order to keep the good drivability.

Figure 7:
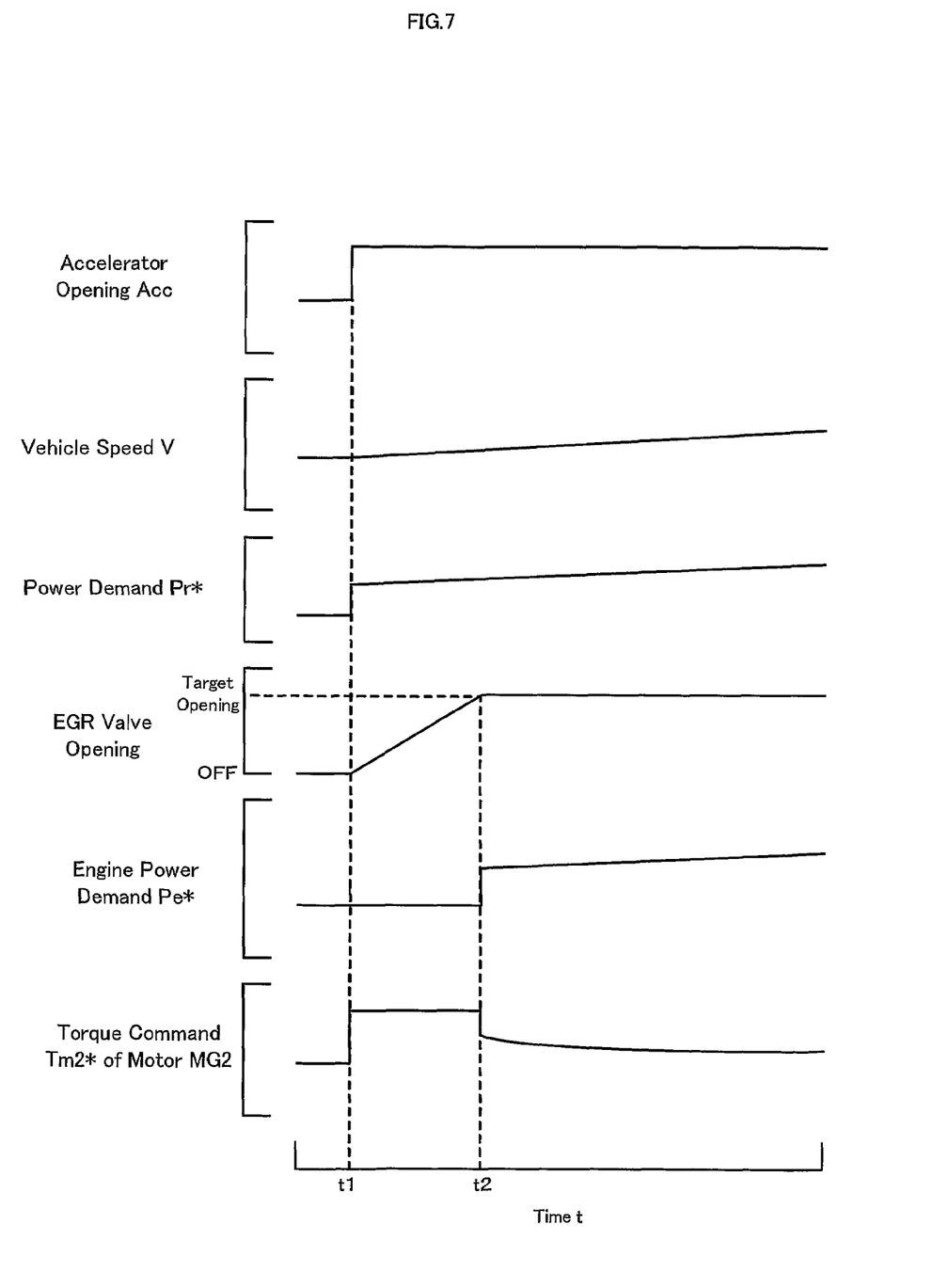

FIG. 7 shows time variations in accelerator opening Acc, vehicle speed V, power demand Pr*, opening of the EGR valve 154, engine power demand Pe*, and torque command Tm2* of a motor MG2 under a switchover operation of the EGR valve 154 from OFF to ON. In the illustrated example of FIG. 7, a switchover operation of the EGR valve 154 from OFF to ON starts at a time point t1 with the driver's additional depression of the accelerator pedal 83. The driver's additional depression of the accelerator pedal 83 increases the power demand Pr* to be output to the ring gear shaft 32a. Until a time point t2 when the actual opening of the EGR valve 154 reaches a preset target opening, however, the engine power demand Pe* is not varied with the increase in power demand Pr* but is kept unchanged to a previous level set before the additional depression of the accelerator pedal 83. The torque command Tm2* of the motor MG2 is set to enable the output power level of the motor MG2 accompanied with discharge of the battery 50 to compensate for an insufficiency of the output power level of the engine 22 due to the unchanged engine power demand Pe*.

In the hybrid vehicle 20 of the embodiment described above, under a switchover operation of the EGR valve 154, the control procedure keeps the engine power demand Pe*, which is set corresponding to the torque demand Tr* to be output to the ring gear shaft 32a, unchanged to the previous level (Previous Pe*), which has been set immediately before the switchover operation of the EGR valve 154, until completion of the switchover operation. The torque command Tm2* of the motor MG2 is set to enable the output power level of the motor MG2 accompanied with charge and discharge of the battery 50 to compensate for a surplus or an insufficiency of the output power level of the engine 22 due to the unchanged engine power demand Pe*. The engine 22 and the motors MG1 and MG2 are then driven and controlled with the preset target values and torque commands. Such control desirably prevents a variation in load of the engine 22 under a switchover operation of the EGR valve 154, that is, a variation in load of the engine 22 simultaneous with the switchover operation of the EGR valve 154, and accordingly ensures the favorable emission control performance, while attaining output of the torque demand Tr* to the ring gear shaft 32a.

In the hybrid vehicle 20 of the embodiment, when the output power level of the motor MG2 can not fully compensate for an insufficiency of the output power level of the engine 22 due to the engine power demand Pe* kept unchanged to the previous level (Previous Pe*) set immediately before the switchover operation of the EGR valve 154, that is, when the motor MG2 fails to satisfy a required output torque level for the output of the torque demand Tr* to the ring gear shaft 32a, the control flow does not keep the engine power demand Pe* unchanged but resets the engine power demand Pe* at step S106 in the flowchart of FIG. 3 to ensure output of the torque demand Tr* to the ring gear shaft 32a. This arrangement effectively responds to the driver's demand.

In the hybrid vehicle 20 of the embodiment, when it is determined at step S124 in the flowchart of FIG. 3 that the tentative motor torque Tm2tmp is out of the range between the input lower and upper torque restrictions Tmin and Tmax or out of the range between the calculated lower and upper torque restrictions Tmin2 and Tmax2 (in the case of a negative answer) due to the engine power demand Pe* kept unchanged to the previous level (Previous Pe*) set immediately before the switchover operation of the EGR valve 154, the control flow goes back to step S106 to reset the engine power demand Pe* as the sum of the power demand Pr*, the charge-discharge power demand Pch*, and the potential loss and successively sets the target rotation speed Ne* and the target torque Te* of the engine 22 and the torque commands Tm1* and Tm2* of the motors MG1 and MG2. One possible modification may set an upper limit and a lower limit to restrict the tentative motor torque Tm2tmp in the range between the input lower and upper torque restrictions Tmin and Tmax and in the range between the calculated lower and upper torque restrictions Tmin2 and Tmax2. The modified control flow omits the processing of steps S124 and S126 but executes the processing of step S116 immediately after step S122.

Figure 8:
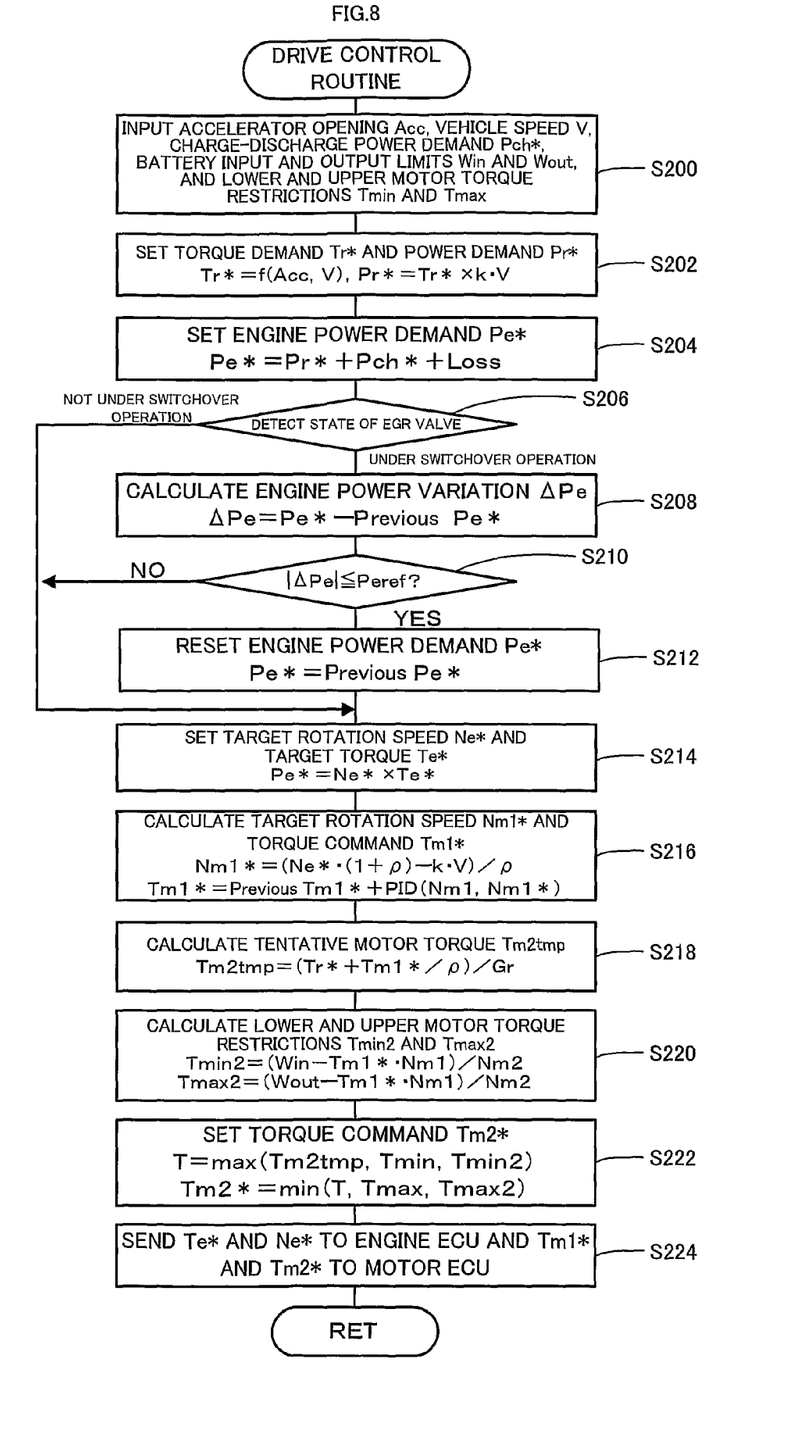
FIG. 8 is a flowchart showing a modified drive control routine.

The hybrid vehicle 20 of the embodiment executes the drive control routine of FIG. 3 to prevent a variation in load of the engine 22 under a switchover operation of the EGR valve 154. The drive control routine of FIG. 3 maybe replaced by a modified drive control routine shown in the flowchart of FIG. 8. The modified drive control routine of FIG. 8 sets the torque demand Tr* and the power demand Pr* to be output to the ring gear shaft 32a based on the accelerator opening Acc and the vehicle speed V input at step S200 (step S202), sets the engine power demand Pe* as the sum of the power demand Pr*, the charge-discharge power demand Pch* of the battery 50, and the potential loss (step S204), and detects the current state of the EGR valve 154 (step S206). Under a switchover operation of the EGR valve 154, an engine power variation ΔPe is calculated by subtracting a previous engine power demand (Previous Pe*) set in a previous cycle of this routine from the current engine power demand Pe* set at step S204 in the current cycle of this routine (step S208). The absolute value of the calculated engine power variation ΔPe is then compared with a preset reference value Peref (step S210). When the absolute value of the calculated engine power variation ΔPe is not greater than the preset reference value Peref, the current engine power demand Pe* set at step S204 is changed to the previous engine power demand (Previous Pe*) set in the previous cycle of this routine, that is, the previous level set immediately before the switchover operation of the EGR valve 154 (step S212). The drive control routine then executes the processing of steps S214 to S224, which is identical with the processing of steps S108 to S118 in the drive control routine of FIG. 3, to control the engine 22 and the motors MG1 and MG2. When the absolute value of the calculated engine power variation ΔPe is greater than the preset reference value Peref at step S210, on the other hand, the engine 22 and the motors MG1 and MG2 are controlled with the current engine power demand Pe* set at step S204 (steps S214 to S224). When the absolute value of the calculated engine power variation ΔPe is greater than the preset reference value Peref, this control procedure adopts the engine power demand Pe* set corresponding to the power demand Pr* of the ring gear shaft 32a at step S204 even under a switchover operation of the EGR valve 154. This ensures a prompt response to the driver's demand. The modified drive control routine of FIG. 8 assures output of the power demand Pr* to the ring gear shaft 32a, while attaining a certain level of the emission control performance.

Under a switchover operation of the EGR valve 154 from ON to OFF or from OFF to ON, the hybrid vehicle 20 of the embodiment keeps the engine power demand Pe* unchanged to the previous level immediately before the switchover. The technique of the invention is, however, not restricted to the ON-OFF or OFF-ON switchover operation. The control technique of the invention is applicable to any variation in EGR rate, for example, an increase from 10% to 20% or a decrease from 15% to 5%, to keep the engine power demand Pe* unchanged to a previous level immediately before the variation of the EGR rate and accordingly prevent a simultaneous variation in load of the engine 22.

Under a switchover operation of the EGR valve 154, the hybrid vehicle 20 of the embodiment keeps the engine power demand Pe* unchanged to the previous level immediately before the switchover. When some load variation of the engine 22 is allowable, the engine power demand Pe* may be varied within the allowable range.

Figure 9:
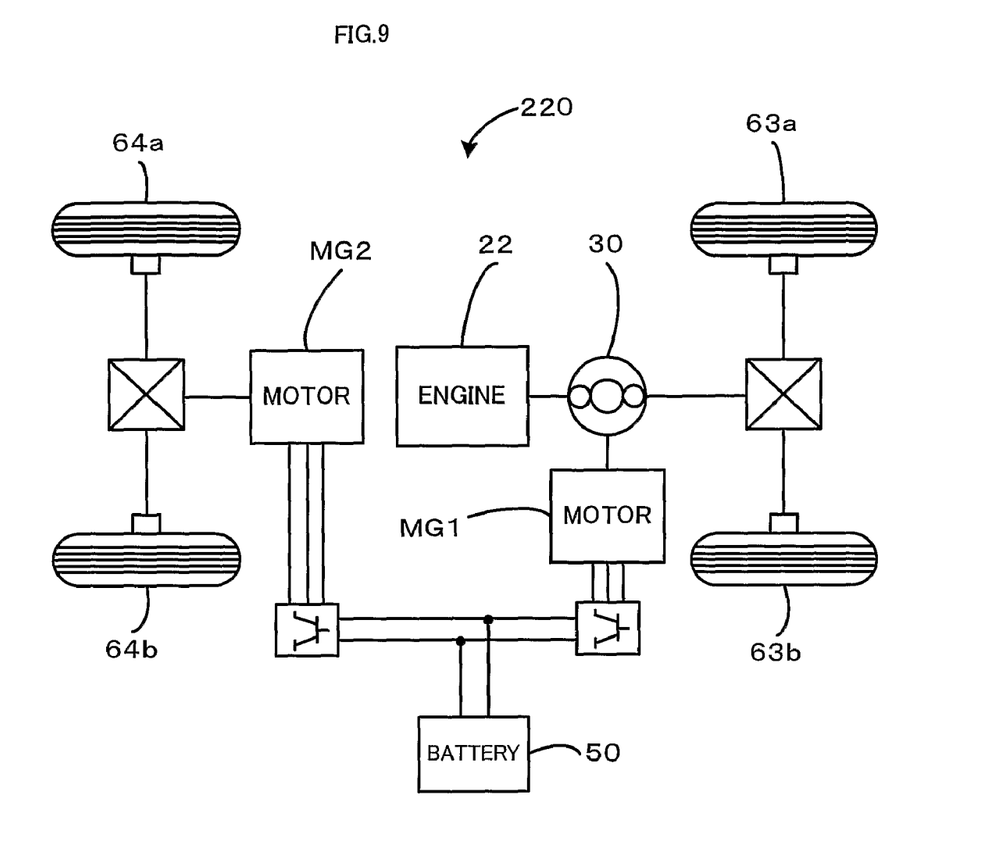
FIG. 9 schematically illustrates the configuration of another hybrid vehicle in one modified example.

In the hybrid vehicle 20 of the embodiment, the power of the motor MG2 is subjected to gear change by the reduction gear 35 and is output to the ring gear shaft 32a. In one possible modification shown as a hybrid vehicle 220 of FIG. 9, the power of the motor MG2 may be output to another axle (that is, an axle linked with wheels 64a and 64b), which is different from an axle connected with the ring gear shaft 32a (that is, an axle linked with the drive wheels 63a and 63b).

Figure 10:
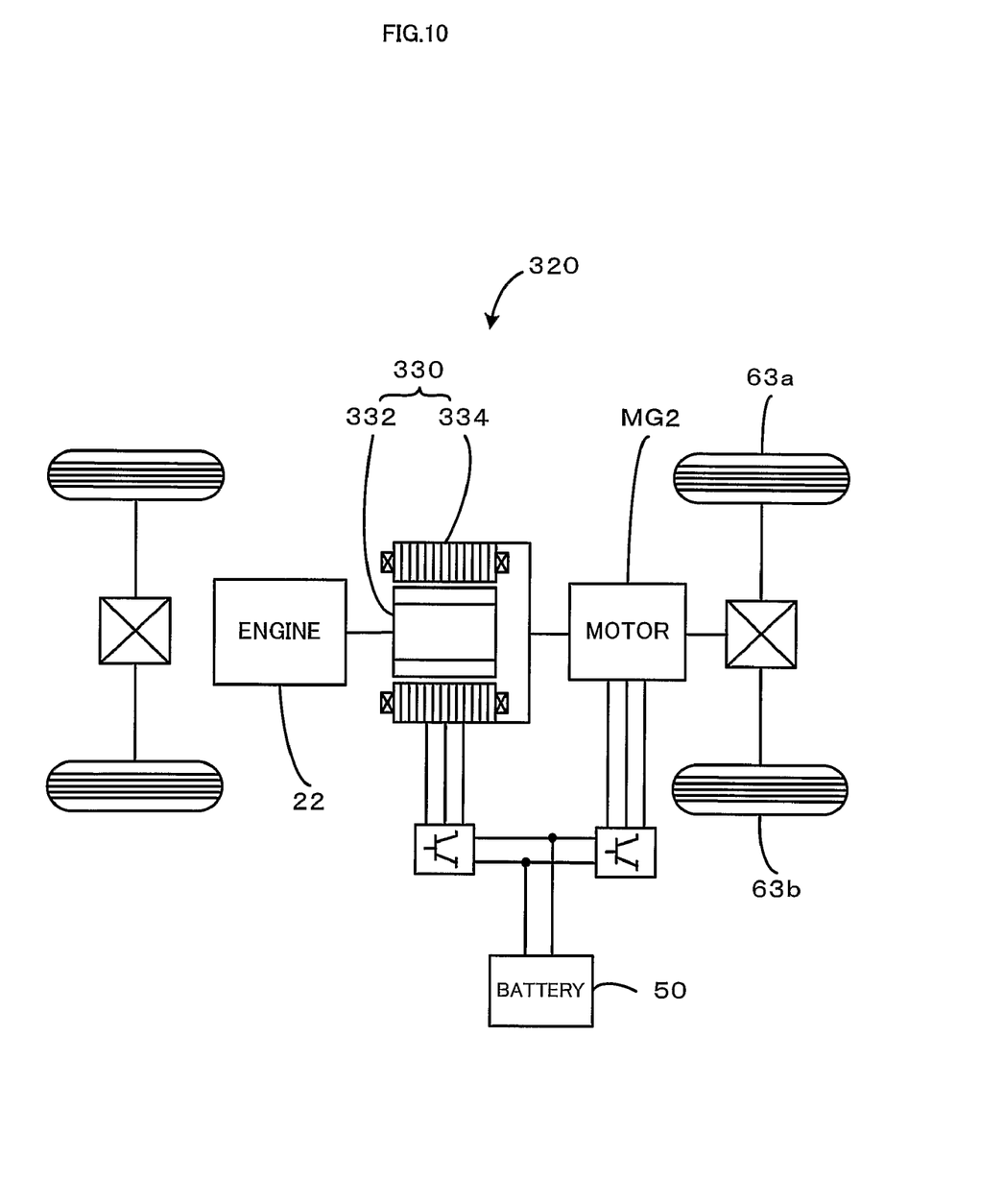
FIG. 10 schematically illustrates the configuration of still another hybrid vehicle in another modified example.
Figure 11:
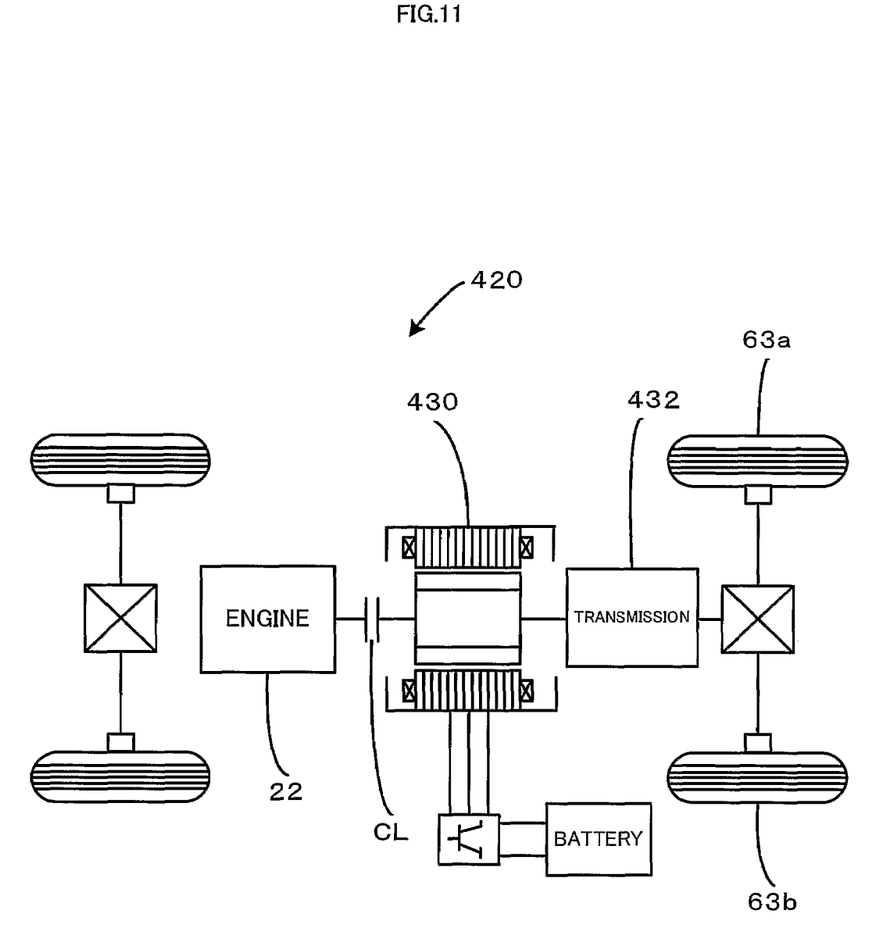
FIG. 11 schematically illustrates the configuration of another hybrid vehicle in still another modified example.

In the hybrid vehicle 20 of the embodiment, the power of the engine 22 is output via the power distribution integration mechanism 30 to the ring gear shaft 32a functioning as the drive shaft linked with the drive wheels 63a and 63b. In another possible modification of FIG. 10, a hybrid vehicle 320 may have a pair-rotor motor 330, which has an inner rotor 332 connected with the crankshaft 26 of the engine 22 and an outer rotor 334 connected with the drive shaft for outputting the power to the drive wheels 63a, 63b and transmits part of the power output from the engine 22 to the drive shaft while converting the residual part of the power into electric power. The technique is also applicable to a hybrid vehicle 420 of FIG. 11 including a motor 22 that is linked via a transmission 432 with a drive shaft connecting with drive wheels 63a and 63b, and an engine 22 that is linked with a rotating shaft of the motor 430 via a clutch CL.

The embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

INDUSTRIAL APPLICABILITY

The technique of the invention is applicable to automobile industries.

The invention claimed is:

1. A power output apparatus that outputs power from an internal combustion engine and power from a motor to a drive shaft, where the internal combustion engine is drivable with a changeable supply of an exhaust gas to an intake system of the internal combustion engine, said power output apparatus comprising:
 a changeover state control module that, under a changeover operation of the supply of the exhaust gas, controls the internal combustion engine to prevent a variation in load of the internal combustion engine until completion of the changeover operation, while controlling the motor to ensure output of a required driving force to the drive shaft;
 an accumulator unit that is charged with electric power received from the motor and discharges electric power to give a supply to the motor; and
 an engine target power setting module that sets a target power to be output from the internal combustion engine corresponding to the required driving force,
 wherein said changeover state control module executes a specific control procedure that keeps unchanged a last target power, which has been set by said engine target power setting module immediately before the changeover operation of the supply of the exhaust gas, and controls the internal combustion engine to be driven with the unchanged last target power, while regulating an output power level of the motor, accompanied with the charge and the discharge of electric power to and from the accumulator unit, to compensate for a difference between the last target power and a power equivalent to the required driving force.

2. A power output apparatus in accordance with claim 1, wherein when the specific control procedure, which controls the internal combustion engine to be driven with the unchanged last target power and regulates the output power level of the motor to ensure the output of the required driving force to the drive shaft, causes the output power level of the motor to exceed an allowable power output range, said changeover state control module controls the internal combustion engine to be driven with a current target power set corresponding to the required driving force by said engine target power setting module and controls the motor to ensure the output of the required driving force to the drive shaft, even under the changeover operation of the supply state of the exhaust gas.

3. A power output apparatus in accordance with claim 1, wherein when a difference between the last target power and a current target power set corresponding to the required driving force by said engine target power setting module is not less than a preset reference value, said changeover state control module controls the internal combustion engine to be driven with the current target power and controls the motor to ensure the output of the required driving force to the drive shaft, even under the changeover operation of the supply state of the exhaust gas.

4. A power output apparatus in accordance with claim 1, wherein the changeover operation of the supply of the exhaust gas changes from a non-supply state to a supply state of the exhaust gas or from the supply state to the non-supply state of the exhaust gas.

5. A power output apparatus in accordance with claim 1, said power output apparatus further comprising:
 a three shaft-type power input output module that is linked to three shafts, that is, an output shaft of the internal combustion engine, the drive shaft, and a third rotating shaft, and automatically determines power input from and output to a residual one shaft based on powers input from and output to any two shafts among the three shafts; and
 a generator that is connected to the third rotating shaft.

6. A power output apparatus in accordance with claim 1, said power output apparatus further comprising:
 a pair-rotor motor that has a first rotor linked to an output shaft of the internal combustion engine and a second rotor linked to the drive shaft and rotates the first rotor and the second rotor relative to each other through an electromagnetic function.

7. A motor vehicle that is driven by outputting power from an internal combustion engine and power from a motor to a drive shaft linked to an axle of said motor vehicle, where the internal combustion engine is drivable with a changeable supply of an exhaust gas to an intake system of the internal combustion engine, said motor vehicle comprising:
 a changeover state control module that, under a changeover operation of the supply of the exhaust gas, controls the internal combustion engine to prevent a variation in load of the internal combustion engine until completion of the changeover operation, while controlling the motor to ensure output of a required driving force to the drive shaft;
 an accumulator unit that is charged with electric power received from the motor and discharges electric power to give a supply to the motor; and
 an engine target power setting module that sets a target power to be output from the internal combustion engine corresponding to the required driving force,
 wherein said changeover state control module executes a specific control procedure that keeps unchanged a last target power, which has been set by said engine target power setting module immediately before the changeover operation of the supply of the exhaust gas, and controls the internal combustion engine to be driven with the unchanged last target power, while regulating an output power level of the motor, accompanied with the charge and the discharge of electric power to and from the accumulator unit, to compensate for a difference between the last target power and a power equivalent to the required driving force.

8. A control method of a power output apparatus that outputs power from an internal combustion engine and power from a motor to a drive shaft, where the internal combustion engine is drivable with a changeable supply of an exhaust gas to an intake system of the internal combustion engine, said power output method comprising the step of:

under a changeover operation of the supply of the exhaust gas, controlling the internal combustion engine to prevent a variation in load of the internal combustion engine until completion of the changeover operation, while controlling the motor to ensure output of a required driving force to the drive shaft;

charging an accumulator unit with electric power received from the motor and discharging electric power from the accumulator to give a supply to the motor; and setting a target power with an engine target power setting module, the target power being outputted from the internal combustion engine corresponding to the required driving force, wherein said changeover state control module executes a specific control procedure that keeps unchanged a last target power, which has been set by said engine target power setting module immediately before the changeover operation of the supply of the exhaust gas, and controls the internal combustion engine to be driven with the unchanged last target power, while regulating an output power level of the motor, accompanied with the charge and the discharge of electric power to and from the accumulator unit, to compensate for a difference between the last target power and a power equivalent to the required driving force.

* * * * *

UNITED STATES PATENT AND TRADEMARK OFFICE
CERTIFICATE OF CORRECTION

PATENT NO. : 7,444,220 B2
APPLICATION NO. : 11/578538
DATED : October 28, 2008
INVENTOR(S) : Makoto Yamazaki It is certified that error appears in the above-identified patent and that said Letters Patent is hereby corrected as shown below:

| Column | Line | |
|---|---|---|
| 10 | 9 | Change "step 9100" to --step S100--. |
| 14 | 62 | Change "regu1ating" to --regulating--. |

Signed and Sealed this

Second Day of June, 2009

JOHN DOLL
*Acting Director of the United States Patent and Trademark Office*